Dec. 30, 1924.

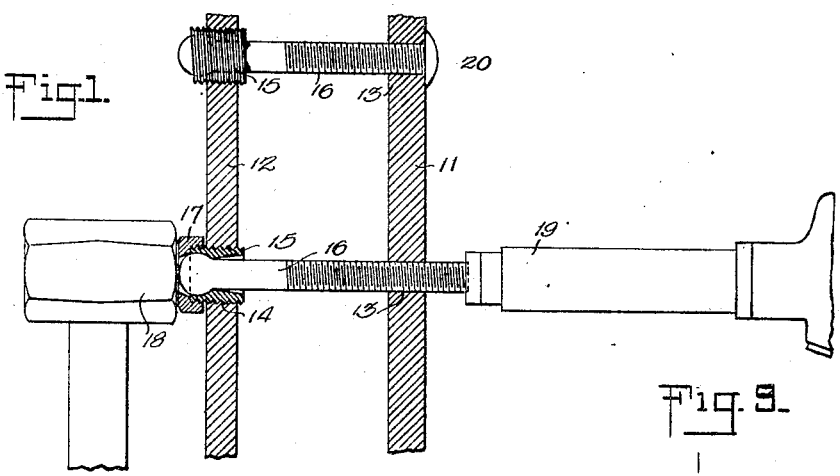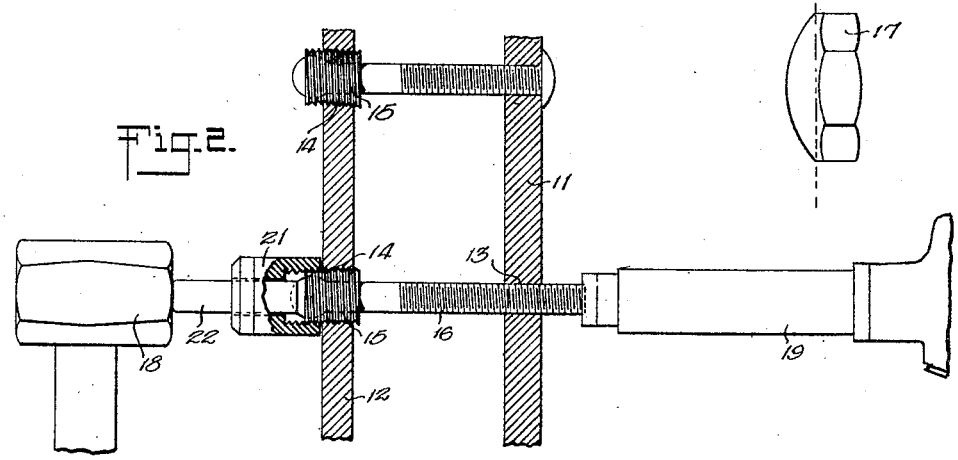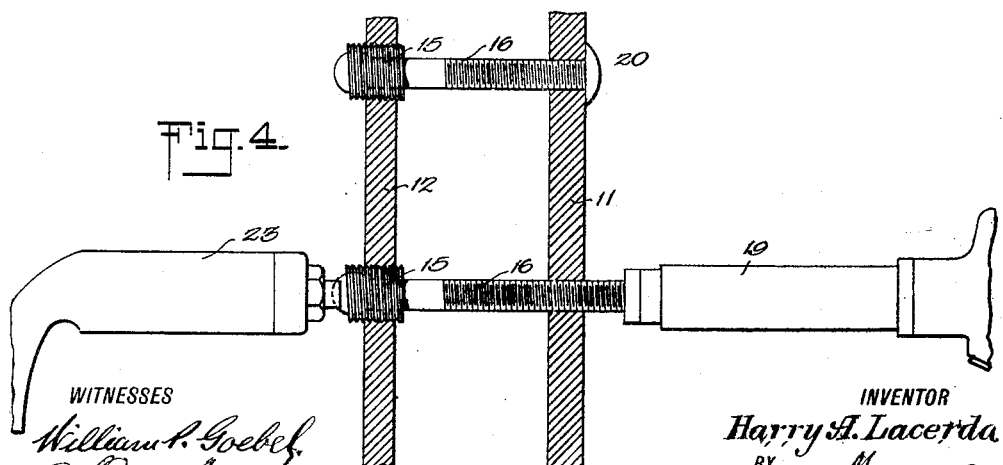

H. A. LACERDA

DOLLY BAR

Filed Sept. 14, 1923

WITNESSES

INVENTOR
Harry A. Lacerda.
BY
ATTORNEYS.

Patented Dec. 30, 1924.

1,521,547

UNITED STATES PATENT OFFICE.

HARRY A. LACERDA, OF WATERVLIET, NEW YORK.

DOLLY BAR.

Application filed September 14, 1923. Serial No. 662,723.

*To all whom it may concern:*

Be it known that I, HARRY A. LACERDA, a citizen of the United States, and a resident of Watervliet, in the county of Albany and State of New York, have invented a new and Improved Dolly Bar, of which the following is a full, clear, and exact description.

This invention relates to improvements in tools, and has particular reference to a dolly bar employed in mounting flexible stay bolts.

In the construction and repair of fire boxes for locomotive engines and the like, it is essential when securing a stay bolt in position that care be taken to prevent flattening or deformation of the head of the bolt which would otherwise disrupt or injure the bushing in which said head is mounted and thus affect the proper expansion and contraction of the fire box walls.

Two methods have heretofore been employed in the mounting of flexible stay bolts. First, it has been a common practice to shear off the closed end of a nut or cap which is ordinarily threaded on the bushing after a stay bolt has been secured in position. The sheared nut is first threaded on the bushing, after which a sledge is engaged with the flat surface of a nut formed by the sheared end, and held in engagement therewith while the automatic hammer is being used to head the other end of the bolt. It then becomes necessary to remove the sheared nut and replace the same with another of the same type which has not been sheared. The second method is similar to the one just mentioned in that a tool is utilized including a body portion which must be threaded upon the bushing during the process of securing the stay bolt in place, after which said body portion must be removed from the bushing and a nut like the one last mention threaded thereon. It has been found in practicing these methods that considerable time and labor is expended in mounting in place and removing the sheared nut of the first method and the tool of the second method. Furthermore, it has been found that in employing said methods extreme care must be exercised when utilizing old bushings in new mountings as is often done, due to the fact that said bushings become very brittle and therefore easily split or otherwise damaged.

An object of the present invention is to provide an improved tool of exceedingly simple and efficient construction, the use of which will overcome the objections to the above methods by making it unnecessary to thread any element on to the bushing prior to securing the bolt in place and removing said element subsequent to the securing operation.

The above and other objects will appear more clearly from the following detail description, when taken in connection with the accompanying drawings, which illustrate preferred embodiments of the inventive idea.

In the drawings—

Figure 1 is a sectional view illustrating the first of the above mentioned known methods of securing a stay bolt in position;

Figure 2 is a similar view illustrating the second mentioned method;

Figure 3 is an elevation of a nut or cap which is used in connection with said methods;

Figure 4 is a view similar to Figures 1 and 2 showing the method of employing the tool of the present invention;

Figure 5:
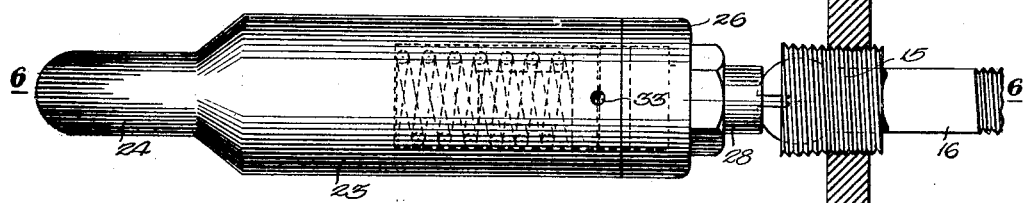
Figure 5 is a side elevation of one form of tool embodying features of the present invention.

Referring more particularly to the accompanying drawings, the numeral 11 indicates the inner wall or fire box sheet of a locomotive fire box, which is surrounded in spaced relation by the outer wall or outside wrapper sheet 12. The sheets 11 and 12 are provided with aligned openings 13 and 14, respectively, the latter openings being screw threaded and of larger diameter to receive the usual bushings 15 utilized to provide a mounting for the headed end of the flexible stay bolts 16, the heads of which are rounded so as to provide a mounting for the stay bolts in the bushings in the nature of a swivel connection which will permit of the usual relative expansion between the sheets 11 and 12. In accordance with the first of the above mentioned methods, after a bushing 15 has been mounted in place with the outer end thereof projecting beyond the outer surface of the sheet 12 and a stay bolt 16 has been mounted in the position shown, a nut or cap 17 which has had its closed end sheared off, as indicated in dotted lines in Figure 3, to provide a flat outer surface is threaded upon the outer end of the bushing 15 in which the head of the stay bolt is disposed. A sledge 18 is then engaged with the flat outer surface of the nut 17 after which the automatic hammer, conventionally illustrated by the numeral 19, is engaged with the inner end of the stay bolt and operated to form the head 20 on said end of the bolt in the usual manner. After this operation has been completed the nut 17 is removed and another nut, such as that shown in Figure 3, is then threaded upon the extended end of the bushing 15 to enclose the head of said bolt, said nut remaining in position until it is desired to remove and replace the bushing or bolt. In actual practice, unskilled labor is employed to first place the sheared nuts 17 in position in advance of the operation of securing the stay bolts and thereafter remove the sheared nuts and replace the same with nuts which are unsheared.

In accordance with the second mentioned method, as illustrated in Figure 2, a sheared nut is replaced by a tool including a body portion 21 internally threaded at one end for receiving the extended end of a bushing 15 having movable longitudinally thereof a pin 22 the inner end of which concaved to engage the head of the stay bolt. The outer end of the pin 22 projects beyond the body portion 21 and may be engaged by the sledge 18 to hold the pin 22 against the stay bolt as the opposite end is being headed by the automatic hammer. In this method it will be seen that it is necessary, as in the first method, to attach, by threading, an element to the bushing 15 prior to the actual operation of securing the bolt in place. After the latter operation the tool 21 must be removed so that the nut 17 may be mounted upon the bushing.

Figure 6:
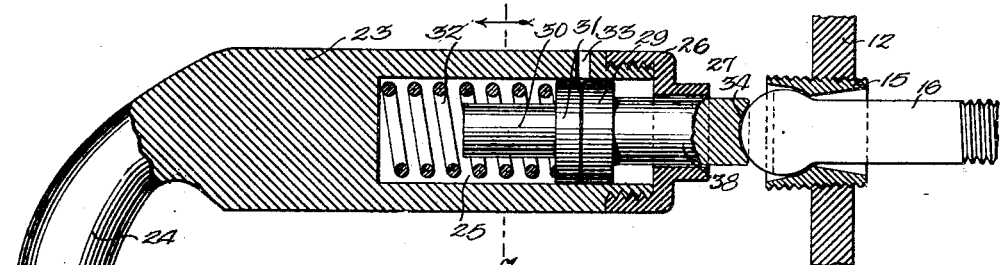
Figure 6 is a longitudinal section on the line 6—6 of Figure 5.
Figure 7:
Figure 7 is a section on the line 7—7 of Figure 6.

The present invention is designed for the purpose of providing a tool which, by its use, will dispense with the necessity of mounting an element upon the bushing prior to the use of the automatic hammer, thus eliminating the loss of time and expense involved in the usual methods. To this end the tool comprises, as shown in the form illustrated in Figures 5, 6 and 7, a body portion 23 which may be made of any desirable material, such as machine steel, having a reduced curved end 24 providing a handle utilized to facilitate the handling of the tool when in use. The body portion 23 is provided therein with a chamber 25 extending longitudinally thereof for a considerable portion of its length and communicating at its open end with the end of the body portion opposite the handle 24. The open end of the body portion 23 is reduced and externally screw threaded to receive thereon a cap 26 having a centrally disposed opening 27 therein communicating with the chamber 25. Slidably mounted in the chamber and having an end projecting through the opening 27 is a head 28 provided at its inner end with a flange 29 of greater diameter than the opening 27 and of substantially the same diameter as that of the chamber 25, so that outward movement of the head will be limited by contact of the flange 29 with the cap 26. Also mounted for longitudinal movement in the chamber 25 inwardly of the head 28 is a centering pin 30 having a flange or a head 31 engageable with the flange 29 of said head 28. In order that an outward pressure upon the head may be normally exerted a compression spring 32 is disposed within the chamber and has one end engageable with the inner end of said chamber and the other end engaged with the flange 31. The spring 32 also provides a shock absorbing cushion for the head 28 as the same is forced inwardly by the action of the automatic hammer against the stay bolt 16. Also the reaction of the spring is such that the head of the stay bolt will be unaffected and will readily enable the user to hold the tool in proper position. The body portion 23 is further provided with an opening 33 through which a lubricant may be injected into the chamber 25 to prevent binding of either of the flanges 29 or 31 in said chamber as the same are rapidly reciprocated. The outer extremity of the head 28 is concaved, as indicated at 34, and shaped to conform to the contour of the headed end of the stay bolts so that the tool may be held in proper operative position during the operation of the automatic hammer.

Figure 10:
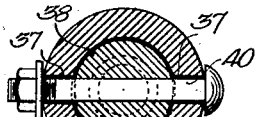
Figure 10 is a section on the line 10—10 of Figure 8.
Figure 8:
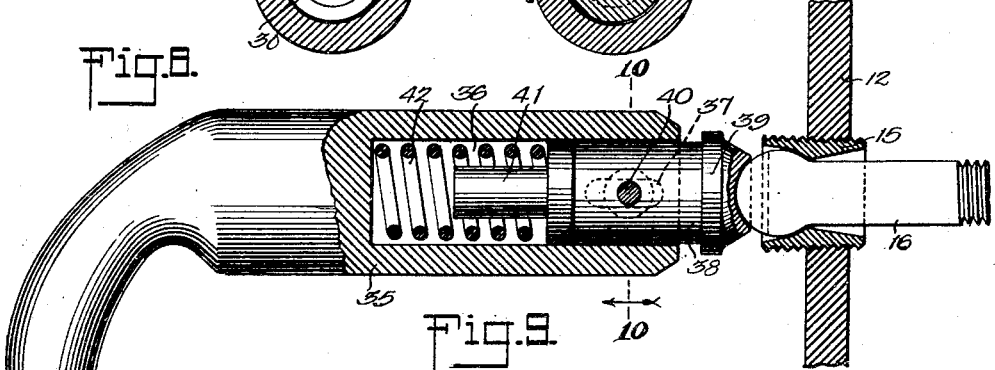
Figure 8 is a longitudinal section through a different form of the invention.
Figure 9:
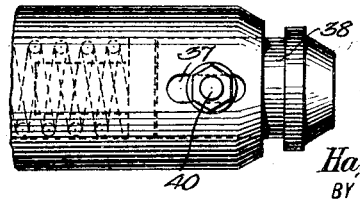
Figure 9 is a fragmentary elevation of the form shown in Figure 8.

In the form of the invention shown in Figures 8, 9 and 10, the body portion 35 of the tool is provided with a chamber 36, similar to the chamber 25, and is further provided adjacent its free end with oppositely disposed longitudinally extending slots 37 communicating with the chamber 36. The sliding head 38 is of substantially the same construction as the head 28 except that the inner end thereof is not provided with a flange, the flange in the present instance being located adjacent the outer end of the head and indicated by the numeral 39. The position of the flange 39 will thus limit the inward movement of the head as the same is reciprocated. Extending transversely through an intermediate portion of the head 38 is a pin or bolt 40, the extremities of which extend through the oppositely disposed slots 37 the walls of which act as guides for the pin and also limit the reciprocatory movement of the head. A centering pin 41, similar in construction to the pin 30, is also mounted within the chamber 36 inwardly of the head 38 and forms an abutment for one end of a coil spring 42, similar to the spring 32.

From the foregoing description, it will be apparent that the invention provides a tool which will effectively hold a stay bolt in position while the same is being secured in place without employing a means necessary to be attached to and detached from the bushing

What is claimed is:

1. In a dolly bar, a body portion having a longitudinal chamber therein extending to one end thereof, a reciprocatory head mounted within said chamber and having one end projecting therefrom and capable of engaging the head of a stay bolt, a headed centering pin engageable with the inner end of said head, and a coil spring having a portion embracing said centering pin and interposed between the head of said pin and the inner end of said chamber.

2. In a dolly bar, a body portion having a longitudinal chamber therein extending to one end thereof, a removable cap for said end of the body portion having an opening therein of less diameter than that of said chamber, a reciprocatory head slidably mounted in the opening in said cap and in said chamber and having a reduced portion projecting beyond said cap for engagement with the head of a stay bolt, the inner end of said head being provided with a flange engageable with the cap to prevent detachment of the head from said body portion, a centering pin having a flange abutting the flange of said head, and resilient means interposed between the inner end of said chamber and the flange of said centering pin for exerting an outward pressure upon said head.

HARRY A. LACERDA.